United States Patent
Naito et al.

(10) Patent No.: US 6,663,687 B2
(45) Date of Patent: Dec. 16, 2003

(54) NIOBIUM POWDER FOR CAPACITOR, SINTERED BODY THEREOF AND CAPACITOR USING THE SINTERED BODY

(75) Inventors: Kazumi Naito, Chiba (JP); Nobuyuki Nagato, Saitama (JP)

(73) Assignee: Showa Denko K.K., Tokyo (JP)

(*) Notice: Subject to any disclaimer, the term of this patent is extended or adjusted under 35 U.S.C. 154(b) by 0 days.

(21) Appl. No.: 10/182,140

(22) PCT Filed: Nov. 30, 2001

(86) PCT No.: PCT/JP01/10485
§ 371 (c)(1),
(2), (4) Date: Jul. 26, 2002

(87) PCT Pub. No.: WO02/45107
PCT Pub. Date: Jun. 6, 2002

(65) Prior Publication Data
US 2003/0007313 A1 Jan. 9, 2003

Related U.S. Application Data
(60) Provisional application No. 60/268,964, filed on Feb. 16, 2001.

(30) Foreign Application Priority Data
Dec. 1, 2000 (JP) ........................................ 2000-366658

(51) Int. Cl.[7] ................................................. C22C 1/04
(52) U.S. Cl. ............................. 75/232; 75/252; 361/528
(58) Field of Search .................... 75/232, 252; 361/528

(56) References Cited

U.S. PATENT DOCUMENTS 5,448,447 A   9/1995  Chang

FOREIGN PATENT DOCUMENTS

WO    WO 00/15555   3/2000

*Primary Examiner*—Ngoclan Mai
(74) *Attorney, Agent, or Firm*—Sughrue Mion, PLLC

(57) ABSTRACT

A niobium powder for capacitors, which contains from 0.05 to 20% by mass of niobium monoxide crystal and from 0.05 to 20% by mass of hexaniobium monoxide crystal; a sintered body thereof; and a capacitor fabricated from the sintered body as one part electrode, a dielectric material formed on the surface of the sintered body, and another part provided on the dielectric material. A capacitor manufactured from a sintered body of a niobium powder of the present invention is favored with good high-temperature characteristics.

14 Claims, No Drawings

NIOBIUM POWDER FOR CAPACITOR, SINTERED BODY THEREOF AND CAPACITOR USING THE SINTERED BODY

CROSS-REFERENCE TO RELATED APPLICATIONS

This application is based on the provisions of 35 U.S.C. Article 111(a) with claiming the benefit of filing dates of U.S. provisional application Serial No. 60/268,964 filed on Feb. 16, 2001, under the provisions of 35 U.S.C. 111(b), pursuant to 35 U.S.C. Article 119(e) (1).

TECHNICAL FIELD

The present invention relates to a niobium powder for capacitors, from which a capacitor having a large capacitance per unit weight and good high-temperature characteristics can be produced, and also relates to a sintered body using the niobium powder and a capacitor using the sintered body.

BACKGROUND ART

Capacitors for use in electronic instruments such as potable telephone and personal computer are demanded to have a small size and a large capacitance. Among these capacitors, a tantalum capacitor is preferred because of its large capacitance for the size and good performance. In this tantalum capacitor, a sintered body of tantalum powder is generally used for the anode moiety. In order to increase the capacitance of the tantalum capacitor, it is necessary to increase the weight of the sintered body or to use a sintered body increased in the surface area by pulverizing the tantalum powder.

The former method of increasing the weight of the sintered body necessarily involves enlargement of the capacitor shape and cannot satisfy the requirement for downsizing. On the other hand, in the latter method of pulverizing tantalum powder to increase the surface area, the pore size of the tantalum sintered body decreases or closed pores increase at the stage of sintering and therefore, impregnation of the cathode agent in the later process becomes difficult. As one of means for solving these problems, a capacitor using a sintered body of powder of a material having a dielectric constant larger than that of tantalum is being studied. The materials known to have a larger dielectric constant include niobium.

However, capacitors using a sintered body manufactured from these materials suffer from insufficient high-temperature characteristics and cannot be used in practice. The ratio between the initial capacitance $C_0$ at room temperature and the capacitance C after the capacitor is left standing in an atmosphere of 105° C. for 2,000 hours while applying a voltage and then returned to room temperature, that is, $(C-C_0)/C_0$ is defined as a high-temperature property. When a sintered body is electrolytically oxidized and then combined with another part electrode to produce a capacitor, insofar as tantalum powder is used, the high-temperature property usually falls within ±20%, but if a conventional niobium powder is used, some capacitors cannot have a high-temperature property falling within ±20%.

As such, capacitors using a niobium powder must be estimated low in the reliability at room temperature and because of this, these capacitors are judged defective in the service life and not used in practice.

As for the technology related to the present invention, a capacitor using partially reduced niobium oxide obtained by heat-treating diniobium pentoxide ($Nb_2O_5$) in the presence of hydrogen, which has a large capacitance and excellent leakage current characteristics, has been proposed (see, WO 00/15555). However, when a capacitor is manufactured using niobium oxide obtained in a test by the present inventors and subjected to an accelerated test at a high temperature, the capacitor performance is deteriorated and not satisfied.

DISCLOSURE OF INVENTION

As a result of extensive investigations, the present inventors have found that when a niobium powder containing niobium monoxide crystal and hexaniobium monoxide crystal are used as the starting material niobium powder of a niobium sintered body, a capacitor having good high-temperature characteristics can be obtained. The present invention has been accomplished based on this finding.

More specifically, the object of the present invention is to provide the following niobium powder for capacitors, a sintered body thereof and a capacitor using the sintered body.

1. A niobium powder for capacitors, containing niobium monoxide crystal and hexaniobium monoxide crystal.
2. The niobium powder for capacitors as described in 1 above, wherein the content of the niobium monoxide crystal is from 0.05 to 20% by mass.
3. The niobium powder for capacitors as described in 1 above, wherein the content of the hexaniobium monoxide crystal is from 0.05 to 20% by mass.
4. The niobium powder for capacitors as described in any one of 1 to 3 above, which contains a partially nitrided niobium powder.
5. The niobium powder for capacitors as described in 4 above, wherein the nitrided amount is 10~100,000 ppm by mass.
6. A sintered body using the niobium powder for capacitors described in any one of 1 to 5 above.
7. A capacitor fabricated from the sintered body described in 6 above as one part electrode, a dielectric material formed on the surface of the sintered body, and another part electrode provided on the dielectric material.
8. The capacitor as described in 7 above, wherein the dielectric material is mainly composed of niobium oxide.
9. The capacitor as described in 8 above, wherein the niobium oxide is formed by electrolytic oxidation.
10. The capacitor as described in any one of 7 to 9 above, wherein the another part electrode is at least one material selected from an electrolytic solution, an organic semiconductor or an inorganic semiconductor.
11. The capacitor as described in 10 above, wherein the another part electrode is composed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane and an organic semiconductor mainly comprising an electrically conducting polymer obtained by doping a dopant into a polymer comprising two or more repeating units represented by the following formula (1) or (2):

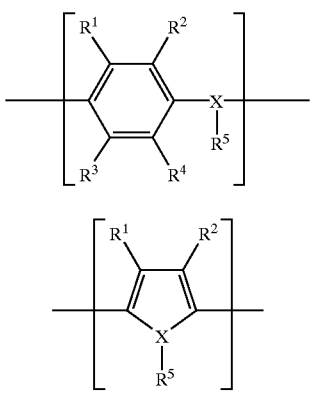

(wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs $R^1$ and $R^2$, and $R^3$ and $R^4$ may combine with each other to form a ring).

12. The capacitor as described in 11 above, wherein the organic semiconductor is at least one member selected from polypyrrole, polythiophene or substitution derivatives thereof.

DETAILED DESCRIPTION OF INVENTION

The niobium powder of the present invention is characterized by containing niobium monoxide crystal and hexaniobium-monoxide crystal.

The niobium powder is inferior to tantalum powder in the stability of oxide dielectric film formed on the sintered body and this difference is particularly remarkable at high temperatures. Many reasons may be considered therefor but as one of those reasons, the inferior stability is considered to come out because the composition of oxide dielectric film is different from the composition of niobium and due to thermal strain at high temperatures, the deterioration of oxide dielectric film is accelerated.

On the other hand, when niobium monoxide crystal and hexaniobium monoxide crystal are incorporated into the niobium powder, it is presumed, the thermal strain at high temperatures is relaxed and therefore, the capacitor manufactured from the niobium powder is improved in the heat stability.

One embodiment for obtaining the niobium powder of the present invention is described below.

The niobium powder for capacitors of the present invention is obtained by granulating a niobium primary particle powder (hereinafter simply referred to as a "primary powder") into an appropriate size. The primary powder of niobium can be granulated by a conventionally known method. Examples thereof include a method where a primary powder is left standing at a high temperature of 500 to 2,000° C. in a vacuum and then wet or dry cracked, and a method where a primary powder is mixed with an appropriate binder such as acrylic resin or polyvinyl alcohol and then cracked. The particle size of the granulated powder can be freely controlled by the degree of granulation and cracking, however, a granulated powder usually used has an average particle size of several μm to thousands of μm. After the granulation and cracking, the powder may be classified.

Also, an appropriate amount of the primary powder may mixed after the granulation.

The raw material of the primary powder may be a commercially available product. For example, the primary powder may be obtained by the reduction of niobium halide using magnesium or sodium, the sodium reduction of potassium fluoroniobate, the molten salt (NaCl+KCl) electrolysis of potassium fluoroniobate on a nickel cathode, the reduction of niobium pentoxide powder using hydrogen, or the introduction of hydrogen into a metal niobium ingot, followed by pulverization and dehydrogenation. The primary powder which can be used has an average particle size of, for example, from 0.1 to tens of μm.

The niobium powder for use in the present invention is obtained by previously mixing niobium monoxide crystal and hexaniobium monoxide crystal with the above-described niobium powder.

For example, these crystals in the form of fine powder (average particle size: approximately from 0.1 to 1,000 μm) are mixed with a niobium powder each in an amount of 0.05 to 20% by mass, preferably from 0.05 to 10% by mass, whereby the niobium powder for capacitors of the present invention can be manufactured.

If the niobium monoxide crystal and the hexaniobium monoxide crystal each exceeds 20% by mass, the initial capacitance value $C_0$ disadvantageously rather decreases. The niobium powder of the present invention can also be obtained by mixing the above-described crystals with the primary powder and then granulating the mixture.

The hexaniobium monoxide crystal can be obtained by reducing niobium monoxide, niobium dioxide or niobium pentoxide using a conventionally known reducing agent such as hydrogen, alkali metal, alkaline earth metal, $NaBH_4$ or $LiBH_4$. The production of hexaniobium monoxide crystal can be confirmed by the X-ray diffraction diagram.

A part of the niobium powder for use in the present invention is preferably nitrided.

The nitrided amount is from 10 ppm by mass to 100,000 ppm by mass. By this partial nitridation, the capacitor manufactured can be improved in the leakage current (LC) characteristics. More specifically, the nitrided amount is preferably from 300 to 7,000 ppm by mass in order to reduce an LC value when the LC value is measured in an aqueous phosphoric acid solution after a sintered body is manufactured from the niobium powder and a dielectric material is formed on the surface of the sintered body.

The "nitrided amount" as used herein means nitrogen with which the niobium powder is reacted and nitrided but excludes nitrogen adsorbed to niobium powder.

The nitridation of the niobium powder can be performed by any one of liquid nitridation, ion nitridation and gas nitridation or by a combination thereof. Among these, gas nitridation in a nitrogen gas atmosphere is preferred because the apparatus therefor is simple and the operation is easy.

The gas nitridation in a nitrogen gas atmosphere can be performed by allowing the niobium powder to stand in a nitrogen gas atmosphere. With a temperature of 2,000° C. or less in the nitridation atmosphere and a standing time of several hours or less, a niobium powder having an objective nitrided amount can be obtained. The treatment time can be shortened by performing the treatment at a higher temperature. The amount of the niobium powder nitrided can be controlled by the conditions confirmed in a preliminary test or the like on the nitridation temperature and nitridation time of the material to-be nitrided.

The nitridation may be performed even after mixing a primary powder or a niobium powder with those crystals.

Another embodiment for obtaining the niobium powder of the present invention is described below.

The primary powder for use in the present invention is a valve-acting metal similar to aluminum and tantalum and therefore, the surface thereof is covered with an oxide in an air. The oxidized amount varies depending on the average particle size of the niobium powder and with an average particle size of 0.1 μm to tens of μm, the oxidized amount is generally from 10,000 to 200,000 ppm by mass. In this primary powder having an oxide, the oxide can be partially or entirely crystallized by controlling the conditions at the time of granulating the primary powder to manufacture the niobium powder, such as temperature rising rate, maximum temperature, standing time at the maximum temperature and lowering rate. The crystallized product is a mixture of niobium monoxide crystal and hexaniobium monoxide crystal. By examining the conditions, also the amounts of niobium monoxide crystal and hexaniobium monoxide crystal in the crystallized product can be adjusted. In this case, although the reason is not clearly known, when a partially nitrided primary powder is used, the amount of hexaniobium monoxide crystal increases sometimes.

In the case of using a crystallization method according to the crystallization conditions under those granulation conditions, the relationship between the above-described conditions at the time of granulation and each crystal amount obtained from the oxide is detected through a preliminary test, whereby in obtaining a niobium powder containing niobium monoxide crystal and hexaniobium monoxide crystal each in the above-described predetermined amount, the amounts of niobium monoxide crystal and hexaniobium monoxide crystal preliminarily mixed with niobium crystal can be reduced or those crystals need not be preliminarily mixed.

The niobium sintered body of the present invention is produced by sintering the above-described niobium powder.

The production method of the sintered body is not particularly limited but, for example, the niobium powder is press-molded into a predetermined shape and then heated at 500 to 2,000° C. for several minutes to several hours under a pressure of $10^{-4}$ to $10^{-1}$ Pa, whereby the sintered body is produced.

A lead wire comprising a valve-acting metal such as niobium or tantalum may be prepared to have an appropriate shape and an appropriate length and integrally molded at the above-described press-molding of niobium powder while inserting a part of the lead wire into the inside of the molded article, so that the lead wire can be designed to work out to a leading line of the sintered body.

The capacitor of the present invention is fabricated from the above-described sintered body as one part electrode, a dielectric material formed on the surface of the sintered body, and another part electrode provided on the dielectric material.

Examples of the dielectric material for the capacitor include dielectric materials composed of tantalum oxide, niobium oxide, a polymer substance or a ceramic compound, with a dielectric material composed of niobium oxide being preferred. The dielectric material composed of niobium oxide can be obtained by chemically forming the niobium sintered body as one part electrode in an electrolytic solution. For chemically forming the niobium electrode in an electrolytic solution, an aqueous protonic acid solution is generally used, such as aqueous 0.1% phosphoric acid solution or aqueous sulfuric acid solution. In the case of obtaining a dielectric material composed of niobium oxide by chemically forming the niobium electrode in an electrolytic solution, the capacitor of the present invention is an electrolytic capacitor and the niobium side serves as anode.

In the capacitor of the present invention, the another part electrode is not particularly limited and for example, at least one compound selected from electrolytic solutions, organic semiconductors and inorganic semiconductors known in the art of aluminum electrolytic capacitor, may be used.

Specific examples of the electrolytic solution include a dimethylformamide-ethylene glycol mixed solution having dissolved therein 5% by mass of isobutyltripropylammonium borotetrafluoride electrolyte, and a propylene carbonate-ethylene glycol mixed solution having dissolved therein 7% by mass of tetraethylammonium borotetrafluoride.

Specific examples of the organic semiconductor include an organic semiconductor comprising a benzene-pyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing two or more repeating units represented by formula (1) or (2):

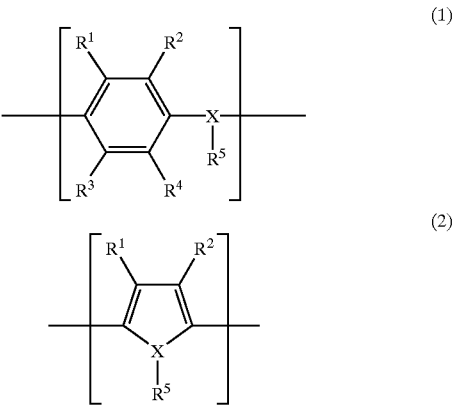

(wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs $R^1$ and $R^2$, and $R^3$ and $R^4$ may combine with each other to form a ring).

The term "mainly comprising an electrically conducting polymer" as used in the present specification means that even an electrically conducting polymer containing components derived from impurities in the starting material monomer of the organic semiconductor can be contained, that is, "an electrically conducting polymer is contained as a substantially effective component".

Examples of the polymer containing the repeating unit represented by formula (1) or (2) include polyaniline, polyoxyphenylene, polyphenylene sulfide, polythiophene, polyfuran, polypyrrole, polymethylpyrrole, and substitution derivatives of these polymers.

Examples of the dopant which can be used include sulfoquinone-base dopants, anthracene monosulfonic acid-base dopants and other various anionic dopants. Also, an electron acceptor dopant such as $NO^+$ or $NO_2^+$ salt may be used.

Specific examples of the inorganic semiconductor include inorganic semiconductors mainly comprising lead dioxide or manganese dioxide, and inorganic semiconductors comprising triiron tetraoxide. These semiconductors may be used individually or in combination of two or more thereof.

When the organic or inorganic semiconductor used has an electrical conductivity of $10^{-2}$ to $10^3$ S·cm$^{-1}$, the manufactured capacitor can have a smaller impedance value and can be more increased in the capacitance at a high frequency.

In the case where the another part electrode is a solid, an electrical conducting layer may be provided thereon so as to attain good electrical contact with an exterior leading line (for example, lead frame).

The electrical conducting layer can be formed, for example, by the solidification of an electrically conducting paste, the plating, the metallization or the formation of heat-resistant electrically conducting resin film. Preferred examples of the electrically conducting paste include silver paste, copper paste, aluminum paste, carbon paste and nickel paste, and these may be used individually or in combination of two or more thereof. In the case of using two or more kinds of pastes, the pastes may be mixed or may be superposed one on another as separate layers. The electrically conducting paste applied is then solidified by allowing it to stand in an air or under heating. Examples of the plating include nickel plating, copper plating, silver plating and aluminum plating. Examples of the metal to be vapor-deposited include aluminum, nickel, copper and silver.

In practice, for example, carbon paste and silver paste are stacked in this order on the another part electrode and these are molded with a material such as epoxy resin, thereby fabricating a capacitor. This capacitor may have a niobium or tantalum lead which is sintered and molded integrally with the niobium sintered body or welded afterward.

The thus-fabricated capacitor of the present invention is jacketed using, for example, resin mold, resin case, metallic jacket case, resin dipping or laminate film, and then used as a capacitor product for various uses.

In the case where the another part electrode is liquid, the capacitor fabricated from the above-described two electrodes and a dielectric material is housed, for example, in a can electrically connected to the another part electrode to complete a capacitor. In this case, the electrode side of the niobium sintered body is guided outside through the above-described niobium or tantalum lead and at the same time, insulated from the can using an insulating rubber or the like.

BEST MODE FOR CARRYING OUT THE INVENTION

The present invention is described in greater detail below by referring to the Examples and Comparative Examples.

The methods for measuring and evaluating the physical properties in each Example are described below.
(1) Contents of Niobium Monoxide Crystal and Hexaniobium Monoxide Crystal in Niobium Powder These contents were calculated using a calibration curve configured from the mass of each crystal, the 2θ diffraction strength at the X-ray diffraction measurement performed after mixing the above-described crystals each having a known mass with a primary powder reduced in the adhered oxygen amount and having an average particle size of 100 μm, and the mass of the mixture.
(2) Nitrided Amount of Niobium Powder The nitrided amount was determined using a nitrogen and oxygen analyzer manufactured by LEKO.
(3) High-Temperature Property of Capacitor The ratio to the capacitance C when the capacitor was allowed to stand in an atmosphere of 105° C. for 2,000 hours while applying a voltage of 4 V and then returned to room temperature, that is, $(C-C_0)/C_0$ was defined as a high-temperature property. The capacitor where this ratio fell within ±20% was judged non-defective, and the evaluation was performed by the ratio of the number of samples to the number of non-defective units. In each Example, 50 units of samples were prepared.

EXAMPLE 1

Niobium monoxide crystal (average particle size: 0.6 μm) and hexaniobium monoxide crystal (average particle size:

0.7 μm) each in an amount of 2% by mass were mixed with a primary powder having an average particle size of 6 μm (the surface thereof was covered with about 0.5% by mass of natural oxide). This mixed crystal primary powder was left standing in a vacuum of $6.7 \times 10^{-3}$ Pa ($5 \times 10^{-5}$ Torr) at a temperature of 1,050° C. at the highest for 30 minutes while elevating the temperature at a temperature rising rate of 10° C./minute. Thereafter, the temperature was lowered at a temperature lowering rate of 80° C./minute while charging Ar gas thereinto and the resulting powder was granulated and cracked to obtain a niobium powder. The content of each crystal in the niobium powder is shown in Table 1. Subsequently, 0.1 g of this niobium powder was weighed and molded together with a niobium lead to obtain a molded article having a size of approximately 3 mm×4 mm×1.8 mm. This molded article was left standing in a vacuum of $6.7 \times 10^{-3}$ Pa ($5 \times 10^{-5}$ Torr) at a temperature of 1,150° C. at the highest for 100 minutes while elevating the temperature at a temperature rising rate of 10° C./minute and then the temperature was lowered at a temperature lowering rate on average of 80° C./minute, thereby obtaining a sintered body. In this way, 50 units of this niobium sintered body were prepared and all units were electrochemically formed (12 V) in an aqueous 0.1% phosphoric acid solution to form an oxide dielectric film composed of niobium oxide on the surface. Thereafter, an operation of dipping each sintered body in an equivalent mixed solution of an aqueous 30% lead acetate solution and an aqueous 30% ammonium persulfate solution and drying the sintered body was performed a plurality of times to form another part electrode composed of lead dioxide and lead sulfate (lead dioxide: 97% by mass) on the oxide dielectric film. Subsequently, a carbon paste and a silver paste were stacked in sequence and after mounting on a lead frame, these were molded with an epoxy resin to manufacture a chip-type capacitor. The high-temperature characteristics (initial capacitance $C_0$ (μF) and high-temperature property) of each capacitor manufactured were evaluated and the results obtained are shown in Table 1 below.

EXAMPLES 2 TO 4 AND COMPARATIVE EXAMPLES 1 TO 3

Niobium powders and capacitors were manufactured in the same manner as in Example 1 except for changing the amount of each crystal mixed to the value shown in Table 1.

EXAMPLES 5 TO 8

A capacitor was manufactured in the same manner as in Example 1 except that a primary particle having an average particle size of 1 μm (the surface thereof was covered with about 2.5% by mass of natural oxide film) was used and this primary powder was allowed to stand at 300° C. for 2 hours in a nitrogen stream to obtain a partially nitrided primary powder (nitrided amount: 2,800 ppm by mass) (Example 5). In Examples 6 to 8, capacitors were manufactured in the same manner as in Example 5 except for using the semiconductor shown in Table 2 as the another part electrode in Example 5.

TABLE 1

| | Amount of Niobium Monoxide Crystal, mass % | Amount of Hexaniobium Monoxide Crystal, mass % | Initial Capacitance $C_0$, μF | High-Temperature Property (non-defective unit/ number of samples) |
|---|---|---|---|---|
| Example 1 | 2.00 | 2.00 | 185 | 50/50 |
| Example 2 | 0.50 | 0.30 | 190 | 50/50 |

TABLE 1-continued

| | Amount of Niobium Monoxide Crystal, mass % | Amount of Hexaniobium Monoxide Crystal, mass % | Initial Capacitance $C_0$, µF | High-Temperature Property (non-defective unit/number of samples) |
|---|---|---|---|---|
| Example 3 | 17.20 | 1.30 | 188 | 50/50 |
| Example 4 | 6.85 | 18.80 | 183 | 50/50 |
| Example 5 | 3.20 | 2.25 | 645 | 50/50 |
| Example 6 | 3.30 | 2.20 | 640 | 50/50 |
| Example 7 | 3.25 | 2.35 | 635 | 50/50 |
| Example 8 | 3.20 | 2.30 | 638 | 50/50 |
| Comparative Example 1 | <0.05 | <0.05 | 181 | 47/50 |
| Comparative Example 2 | <0.05 | 23.25 | 135 | 50/50 |
| Comparative Example 3 | 20.55 | <0.05 | 127 | 50/50 |

TABLE 2

| | Another Part Electrode | Electrode Formation Method |
|---|---|---|
| Example 6 | polypyrrole doped with sulfo-aromatic compound anion | repetition of oxidation reaction in pyrrole gas |
| Example 7 | manganese dioxide | repetition of thermal decomposition of manganese nitrate |
| Example 8 | polythiophene derivative doped with sulfo-aromatic compound anion | repetition of oxidation reaction in thiophene derivative solution |

From the comparison of Examples 1 to 8 with Comparative Examples 1, it is seen that when niobium monoxide crystal and hexaniobium monoxide crystal are present in the niobium powder each in an amount of 0.05% or more, the high-temperature characteristics are improved. Also, from the comparison of Example 1 with Comparative Example 2 and with Comparative Example 3, it is seen that when the crystal amount exceeds 20% by mass, the initial capacitance decreases.

INDUSTRIAL APPLICABILITY

When the niobium powder of the present invention containing niobium monoxide crystal and hexaniobium monoxide crystal each in an amount of 0.05 to 20% by mass is used in a capacitor, the manufactured capacitor can have a large capacitance per unit mass and good high-temperature characteristics.

What is claimed is:

1. A niobium powder for capacitors, containing niobium monoxide crystal and hexaniobium monoxide crystal.

2. The niobium powder for capacitors as claimed in claim 1, wherein the content of the niobium monoxide crystal is from 0.05 to 20% by mass.

3. The niobium powder for capacitors as claimed in claim 1, wherein the content of the hexaniobium monoxide crystal is from 0.05 to 20% by mass.

4. The niobium powder for capacitors as claimed in claim 1, which contains a partially nitrided niobium powder.

5. The niobium powder for capacitors as claimed in claim 4, wherein the nitrided amount is 10~100,000 ppm by mass.

6. A sintered body using the niobium powder for capacitors claimed in claim 1.

7. A capacitor fabricated from the sintered body claimed in claim 6 as one part electrode, a dielectric material formed on the surface of the sintered body, and another part electrode provided on the dielectric material.

8. The capacitor as claimed in claim 7, wherein the dielectric material is mainly composed of niobium oxide.

9. The capacitor as claimed in claim 8, wherein the niobium oxide is formed by electrolytic oxidation.

10. The capacitor as claimed in claim 7, wherein the another part electrode is at least one material selected from an electrolytic solution, an organic semiconductor or an inorganic semiconductor.

11. The capacitor as claimed in claim 10, wherein the another part electrode is composed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane and an organic semiconductor mainly comprising an electrically conducting polymer obtained by doping a dopant into a polymer comprising two or more repeating units represented by the following formula (1) or (2):

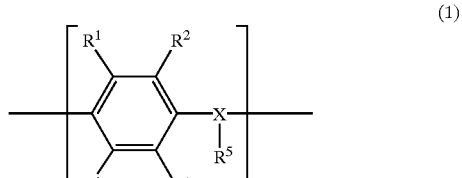

(1)

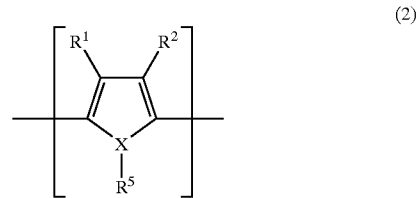

(2)

(wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs $R^1$ and $R^2$, and $R^3$ and $R^4$ may combine with each other to form a ring).

12. The capacitor as claimed in claim 11, wherein the organic semiconductor is at least one member selected from polypyrrole, polythiophene or substitution derivatives thereof.

13. The niobium powder for capacitors as claimed in claim 2, which contains a partially nitrided niobium powder.

14. The niobium powder for capacitors as claimed in claim 3, which contains a partially nitrided niobium powder.

* * * * *